United States Patent [19]

Fujimoto et al.

[11] Patent Number: 5,120,556

[45] Date of Patent: Jun. 9, 1992

[54] METHOD FOR INHIBITING OXIDATION OF UNSATURATED HYDROCARBON COMPOUNDS AND FOOD AND DRINK CONTAINING SUCH COMPOUNDS

[75] Inventors: Kenshiro Fujimoto, Sendai; Katsuhisha Yamaguchi, Tokuyama; Magoichi Yamaguchi, Fuji, all of Japan

[73] Assignees: Idemitsu Petrochemical Co., Ltd.; Nihon Shokuhin Kako Co., Ltd., both of Tokyo, Japan

[21] Appl. No.: 559,846

[22] Filed: Jul. 30, 1990

[30] Foreign Application Priority Data

Aug. 4, 1989 [JP] Japan ................. 1-202580

[51] Int. Cl.$^5$ ................. A23L 2/00; A23L 3/34
[52] U.S. Cl. ................. 426/330.3; 426/543
[58] Field of Search ............. 426/542, 543, 590, 599, 426/330.6, 330.3

[56] References Cited

U.S. PATENT DOCUMENTS

| | | | |
|---|---|---|---|
| 2,176,030 | 10/1979 | Musher | 426/543 |
| 2,232,555 | 2/1941 | Musher | 426/543 |
| 2,282,784 | 4/1940 | Musher | 426/543 |
| 2,355,097 | 8/1944 | Musher | 426/542 |
| 2,925,345 | 2/1960 | Baker | 426/543 |
| 2,975,066 | 3/1961 | Baker | 426/543 |
| 4,181,748 | 1/1980 | Chwalek | 426/630 |
| 4,495,207 | 1/1985 | Christianson | 426/622 |
| 4,568,557 | 2/1986 | Becker | 426/93 |
| 4,673,578 | 6/1987 | Becker | 426/618 |
| 4,744,926 | 5/1988 | Rice | 426/601 |
| 4,787,981 | 11/1988 | Tanahashi | 426/417 |
| 4,808,426 | 2/1989 | Strop | 426/429 |
| 4,944,954 | 7/1990 | Strop | 426/429 |
| 4,948,619 | 8/1990 | Antrim | 426/543 |

FOREIGN PATENT DOCUMENTS 2436178 4/1980 France .
591511 4/1945 United Kingdom .

OTHER PUBLICATIONS

Database WPIL/Derwent accession No. 82-03718J (48), 1982, Derwent Publications Ltd., London, GB; and JP-A-57174066, Oct. 26, 1982.

Database WPIL/Derwent accession No. 78-35969A (20), 1978, Derwent Publications Ltd., London, GB; and JP-A-53038646 Aug. 4, 1978.

Database WPIL/Derwent accession No. 82-89269E (42), 1982, Derwent Publications Ltd., London, GB; and JP-A-57147582, Nov. 9, 1982.

Primary Examiner—Carolyn Paden
Attorney, Agent, or Firm—Frishauf, Holtz, Goodman & Woodward

[57] ABSTRACT

A method for inhibiting oxidation, comprising adding a defatted corn germ to an unsaturated fat or oil, an unsaturated fatty acid, an unsaturated hydrocarbon, or food and drink containing any of these and the product of said process.

14 Claims, 5 Drawing Sheets

METHOD FOR INHIBITING OXIDATION OF UNSATURATED HYDROCARBON COMPOUNDS AND FOOD AND DRINK CONTAINING SUCH COMPOUNDS

FIELD OF THE INVENTION

The present invention relates to a natural (or naturally occurring) antioxidant material comprising a defatted corn germ as an active ingredient, food and drink containing it, and a method for inhibiting oxidation.

BACKGROUND OF THE INVENTION

Unsaturated fatty acids, in particular, higher unsaturated fatty acids, contained in fats and oils of food may cause peroxidation, and hence deterioration of food mainly results therefrom. These higher unsaturated fatty acids tend to undergo oxidation, and peroxides or free radicals thus produced not only bring about loss of flavor but also are considered to be the cause of aging (or senility) or carcinogenesis in living bodies.

In order to inhibit the oxidation of unsaturated fatty acids, it has been attempted to add a synthetic antioxidant such as 2,6-di-tert-butyl-4-methylphenol (BHT) or butyl hydroxyanisole (BHA), and a naturally occurring antioxidant such as tocopherol, a flavonoid derivative or a lignan analogue.

The synthetic antioxidant such as BHT or BHA has a problem in its safety, and hence the amount of use thereof or the objects to which it is used are restricted. Accordingly, it has been sought to provide an antioxidant which is safer and is free from any restriction of use. The BHT and BHA not only have the problem in safety but also have a question about efficacy in respect of eicosapentaenoic acid (EPA), docosahexaenoic acid (DHA) or fish oil. Thus, it has been sought to develop a remarkably effective antioxidant for these higher unsaturated fatty acids.

On the other hand, although the natural antioxidant is considered safer than the synthetic one, it is chiefly tocopherol that is actually used, and other natural antioxidants have been little used alone.

However, the tocopherol can not have a sufficient antioxidant effect against fats and oils that contain a higher unsaturated fatty acid like fish oil and tend to undergo oxidation.

As a natural antioxidant material, a soybean protein containing a flavonoid derivative, a sesami protein containing a lignan analogue, and a wheat protein as well are known to have an antioxidant effect. There, however, is no report on an antioxidant obtainable from other protein materials.

SUMMARY OF THE INVENTION

Accordingly, an object of the present invention is to provide a naturally occurring antioxidant material that can be used more safely and is hitherto unknown in the art, and also provide food and drink making use of it and a method for inhibiting oxidation.

In order to achieve the above object, the present inventors made intensive researches for a natural material having an antioxidant effect against fats and oils, in particular, higher unsaturated fatty acids contained in fish oil, etc. As as result, they have discovered that a defatted corn germ has a superior antioxidant effect against the above fats and oils, and thus accomplished the present invention.

The present invention provides a natural antioxidant material comprising as an active ingredient a defatted corn germ.

The present invention also provides food and drink comprising an unsaturated fat or oil, an unsaturated fatty acid or an unsaturated hydrocarbon, and a defatted corn germ added thereto.

The present invention still also provides a method for inhibiting oxidation, comprising adding a defatted corn germ to an unsaturated fat or oil, an unsaturated fatty acid, an unsaturated hydrocarbon, or food and drink containing any of these.

As will be shown in Examples described later, the natural antioxidant material of the present invention can effectively inhibit the oxidation of unsaturated fatty acids contained in fats and oils. The corn germ is a naturally occurring material, and has a safety to human bodies.

Thus, the present antioxidant material can be added to unsaturated fats and oils, unsaturated fatty acids, unsaturated hydrocarbons, or food containing these, as exemplified by edible fats and oils, foods containing a large quantity of fats and oils, such as fried bread, fried foods and pork cutlets, and also functional foods containing eicosapentaenoic acid (EPA), docosahexaenoic acid (DHA) or the like. The addition thereof enables suppression of smell caused by oxidation, deterioration of flavor and color, or development of toxicity originating from a peroxide or the like.

DESCRIPTION OF THE PREFERRED EMBODIMENTS

The present invention will be described below in detail by giving preferred embodiments.

Germs separated from, for example, corn grains by wet milling or dry milling can be used as the corn germ that serves as a starting material for the natural antioxidant material of the present invention. From the resulting germs, corn oil may further be extracted by pressing or hexane extraction, and the residue may be used.

The natural antioxidant material of the present invention can be obtained by defatting the above corn germs. Supercritical gas extraction or organic solvent extraction may preferably be used for the defatting. In particular, supercritical gas extraction is preferred.

Figure 5:
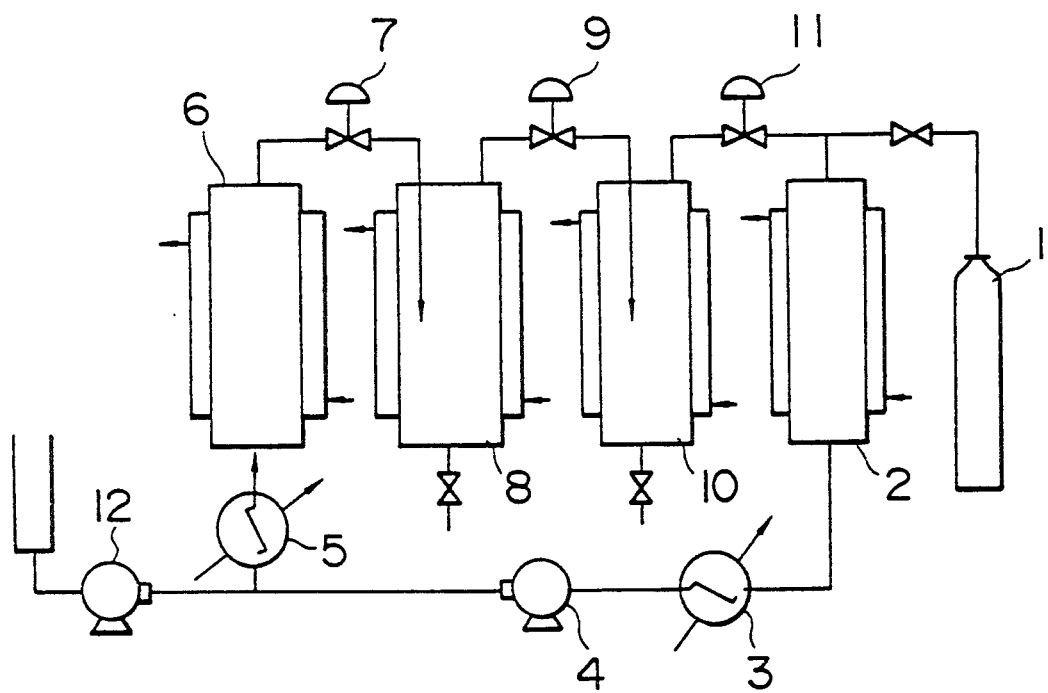
FIG. 5 schematically illustrates an example of an apparatus for supercritical gas extraction.

The supercritical gas extraction can be carried out using an apparatus for supercritical gas extraction as shown, for example, in FIG. 5. More specifically, carbon dioxide charged from a carbon dioxide bomb 1 into a liquid carbon dioxide reservoir 2 is cooled in a cooler 3 to a given temperature. Its pressure is raised to a given pressure with a pump 4. Thereafter, the gas is set to a given extraction temperature through a heater 5, where it is brought into a supercritical state and then led in an extraction tank 6. The extraction tank 6 is filled with the starting material corn germs, which are brought into contact with carbon dioxide containing ethyl alcohol to carry out extraction. The carbon dioxide that has extracted oil contents in the extraction tank 6 is led in a first separation tank 8 through a pressure reducing valve 7, where the oil contents are separated from carbon dioxide. The carbon dioxide led out of the first separation tank 8 is further decompressed through a pressure reducing valve 9, and then led in a second separation tank 10, where the remaining oil contents are removed. The resulting gas is subsequently decompressed through a reducing valve 11. Thereafter, the gas is returned to the liquid carbon dioxide reservoir 2, and reused. The ethyl alcohol is compressed to a given pressure with a pump 12, and thereafter a given amount thereof is mixed in carbon dioxide, which is then led in the extraction tank 6. After the extraction, the treated products are separated in the first separation tank 8 and/or second separation tank 10. The corn germs from which oil contents have been thus removed can be collected from the extraction tank 6 after the extraction tank 6 has been evacuated to atmospheric pressure.

In the foregoing description, carbon dioxide is used as an extraction agent. Besides the carbon dioxide, however, it is possible to use ethane, nitrogen dioxide and so forth. Carbon dioxide is most preferred for the reasons that what is extracted is food and carbon dioxide is inexpensive.

In addition to the above ethyl alcohol, it is also possible to use n-hexane, acetone or methyl alcohol as an extraction aid. Ethyl alcohol is most preferred because the effect of defatting and deodorizing must be taken into account and it is applied to food.

The defatting of corn germs by the use of carbon dioxide in a supercritical state may preferably be carried out under extraction conditions of a pressure of from 80 to 500 kg/cm$^2$, and more preferably from 250 to 400 kg/cm$^2$, and a temperature of from 30° to 80° C., and more preferably from 35° to 50° C.

The extraction aid ethyl alcohol may suitably be used in an amount of from 1 to 30% (weight ratio), and preferably from 3 to 15% (weight ratio), as the concentration of ethyl alcohol in carbon dioxide.

On the other hand, in the instance where the corn germs are defatted by organic solvent extraction, an organic solvent includes a vast range of organic solvents such as hexane, ether, chloroform, methanol and ethanol, which may be used alone or by mixture. Any of these organic solvents may also be used as a mixture with water. In particular, a mixed solvent of ethanol with water may preferably be used, where they may preferably be used in a weight ratio of ethanol to water of from 90:10 to 60:40, and most preferably 70:30.

The extraction using the organic solvent may preferably be carried out at a temperature of from 50° to 100° C., and more preferably from 70° to 90° C., for 1 to 3 hours. Undesirable components in corn germs are also removed as a result of the organic solvent extraction.

The corn germs thus defatted should preferably have a fat or oil content of not more than 3%, and more preferably not more than 1%.

The antioxidant material of the present invention can effectively inhibit the oxidation of unsaturated fatty acids, in particular, unsaturated fats and oils that readily undergo oxidation. The unsaturated fats and oils specifically include fish oil, soybean oil, perilla oil jojoba oil, and almond oil. The antioxidant material of the present invention can also effectively inhibit the oxidation of unsaturated hydrocarbons such as squalene. It can further be applied to unsaturated fatty acids such as eicosapentaenoic acid (EPA) and docosahexaenoic acid (DHA), and esters of ethyl alcohol thereof.

The food and drink of the present invention can be obtained by adding the above antioxidant material to food and drink containing the unsaturated fats and oils, unsaturated fatty acids or unsaturated hydrocarbons as described above.

The food and drink containing these unsaturated fats and oils, unsaturated fatty acids or unsaturated hydrocarbons includes, for example, fats and oils such as edible oil, fat and oil products such as butter and margarine, fried noodles prepared using fats and oils and fat and oil products, and foods containing a large quantity of fats and oils, such as fried bread, fried foods and pork cutlets, and also health foods such as tablets obtained from a base material comprising powdered fats and oils.

The method of the present invention for inhibiting oxidation comprises adding the defatted corn germ to an unsaturated fat or oil, an unsaturated fatty acid, an unsaturated hydrocarbon, or food and drink containing any of these.

In the food and drink and the method for inhibiting oxidation, of the present invention, the ratio of the unsaturated fat or oil, the unsaturated fatty acid or the unsaturated hydrocarbon to the antioxidant material defatted corn germ may preferably be from 0.5:99.5 to 70:30, and more preferably from 0.5:99.5 to 50:50, in weight ratio.

There are no particular limitations on the method of blending the unsaturated fats and oils or the like and the defatted corn germs. They may be merely blended, or may be blended by suspending the unsaturated fats and oils or the like and the defatted corn germs in water, followed by drying by means of a spray dryer.

The present invention will be described below in greater detail by giving Examples.

EXAMPLE 1

Germs were separated from corn grains by dry milling. Using an apparatus for supercritical gas extraction, the resulting corn germs were subjected to an extraction (defatting) treatment at an extraction pressure of 350 kg/cm$^2$. G, at an extraction temperature of 40° C. and by the use of carbon dioxide to which 5% of ethyl alcohol was added as an extraction aid. A defatted corn germ (1) with an oil content of 0.8% was obtained as an antioxidant material.

EXAMPLE 2

Germs were separated from corn grains by wet milling. Corn oil was extracted from the resulting corn germs by pressing to give a corn germ with an oil content of about 10%. This corn germ was extracted using carbon dioxide, by means of an apparatus for supercritical gas extraction. The extraction was carried out under conditions of 350 kg/cm$^2$. G and 40° C. A corn germ (2) defatted to have an oil content of 0.29% was thus obtained as an antioxidant material.

EXAMPLE 3

Germs were separated from corn grains by wet milling. Corn oil was extracted from the resulting corn germs by pressing to give a corn germ with an oil content of about 10%. This corn germ was immersed in a mixed solvent of 70% ethanol and 30% water, and treated at 80° C. for 2 hours, followed by separation of the residue. A corn germ (3) defatted to have an oil content of 3.0% was thus obtained as an antioxidant material.

Next, in the following Examples 4 to 8, changes with time of oxygen absorption of the antioxidant materials obtained in Examples 1, 2 and 3, i.e., the defatted corn germs (1), (2) and (3), were measured to confirm their antioxidant effects against unsaturated fats and oils.

In order to confirm their effects in foods, various foods were prepared as experiments, and the peroxide values (POV) were measured to make evaluation.

For comparison, the corresponding values were also similarly measured in respect of corn starch (4), wheat gluten (5), milk casein (6) and wheat gliadin (7).

EXAMPLE 4

Measurement-1, changes with time of oxygen absorption

Changes with time of oxygen absorption were measured in the following way:

As fats and oils, methyl linolate was dissolved in ether, and then the solution was added to a sample so as for the methyl linolate and the sample to be 1:9 in weight ratio. Ether was removed while they were blended in a mortar. A 1 g portion was collected from the resulting mixture, and put in a 15 ml test tube, which was then stoppered with a W-rubber cap, and preserved in the dark at 60° C. As time lapses, 10 μl of the gas in the head space of the test tube was drawnp using a microsyringe, and the ratio of oxygen to nitrogen was measured by gas chromatography.

The measurement by gas chromatography was under the following conditions:
Column: Molecular sieves 5A
Detector: TCD
Column temperature: 50° C.
Detection temperature: 90° C.
Injection temperature: 90° C.
Carrier gas: Helium.

Figure 1:
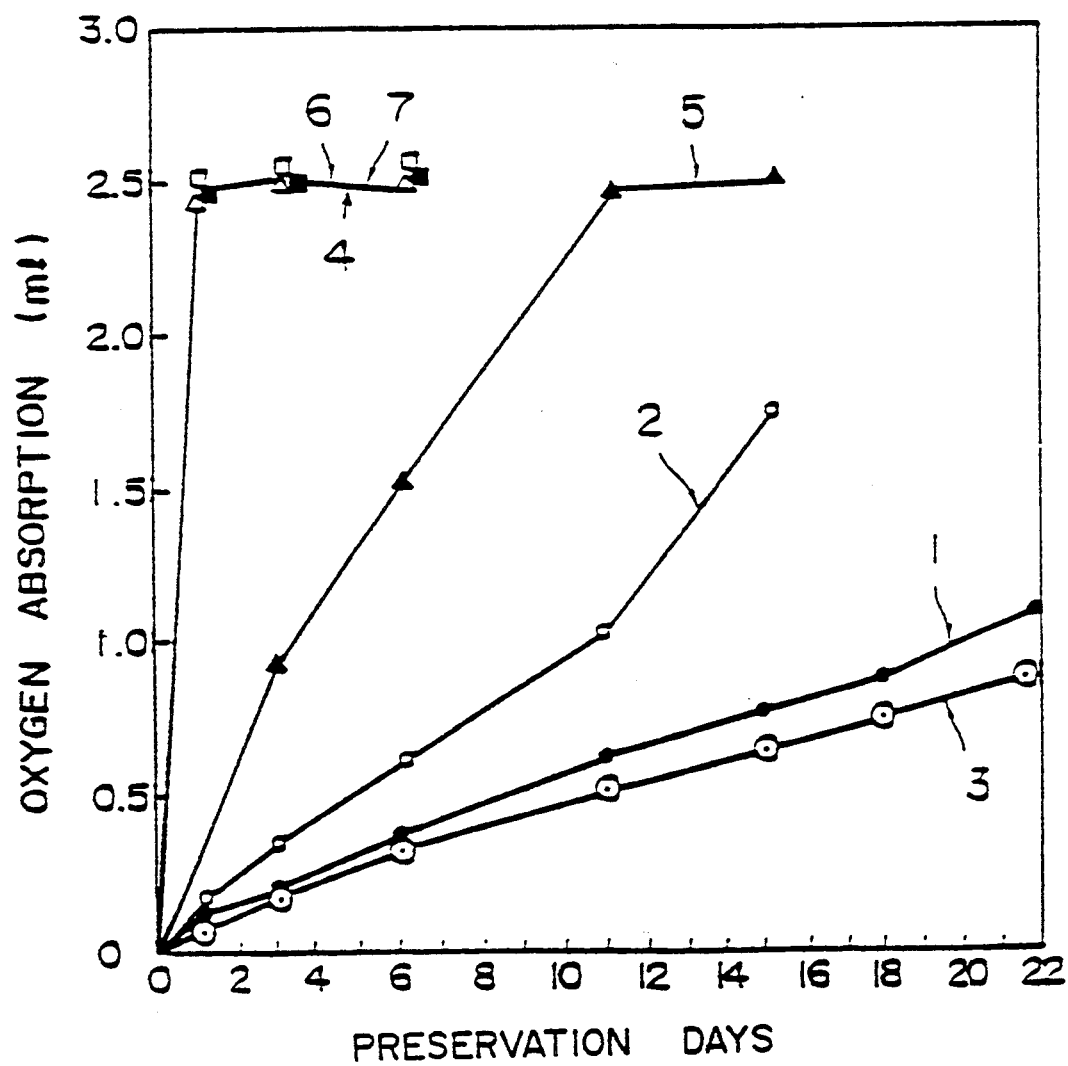
FIG. 1 shows changes with time of oxygen absorption observed when methyl linolate has been treated with various natural materials.

Results obtained are shown in FIG. 1 (the number in a circle in the drawings corresponds to the number in parentheses is Examples; the same applies hereinafter). It is seen from the results that, compared with the samples (4) to (7) of corn starch (the line with triangles in the figure), wheat gluten (the line with solid triangles in the figure), milk casein (the line with squaress in the figure) and wheat gliadin (the line with solid squares in the figure), respectively, the defatted corn germs (1) to (3) of the present invention each show very low values of the oxygen absorption observed with time and thus the oxidation of fats and oils has been inhibited.

EXAMPLE 5

Measurement-2, changes with time of oxygen absorption

Changes with time of oxygen absorption were measured on the samples (1), (2), (3) and (5) in the same manner as in Example 1, except that as fats and oils the methyl linolate was replaced with fish oil containing 25% of EPA.

Figure 2:
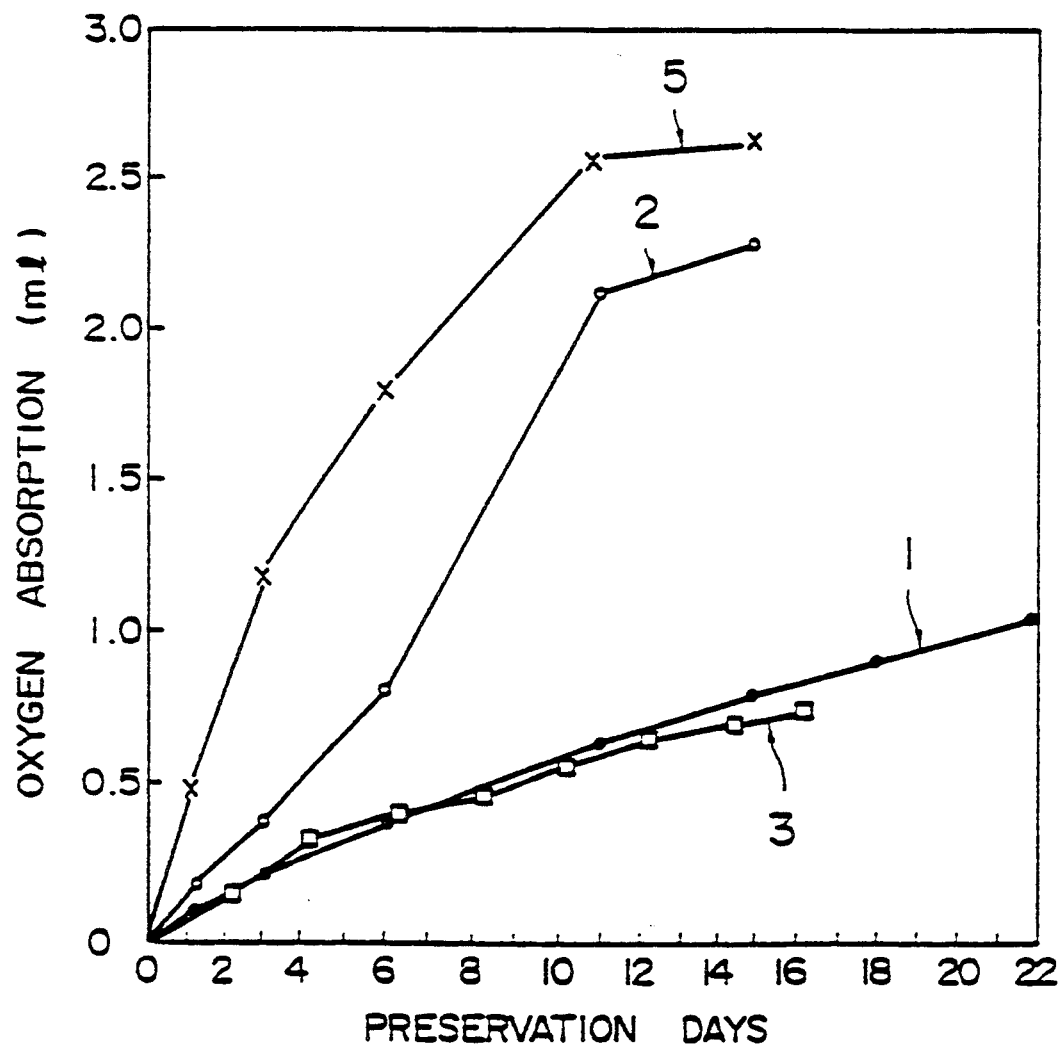
FIG. 2 shows changes with time of oxygen absorption observed when a fish oil containing EPA has been treated with various natural materials.

Results obtained are shown in FIG. 2. It is seen from the results that, compared with the wheat gluten (5), the defatted corn germs (1) to (3) of the present invention each show very low values of the oxygen absorption observed with time and thus the oxidation of fats and oils has been inhibited.

EXAMPLE 6

A coating base of a pork cutlet

In 180 g of wheat weak flour, 20 g of the defatted corn germ (1) obtained in Example 1 was blended to give a coating base.

To each of the above coating base and a control coating base composed of wheat weak flour alone, a half of egg and 160 ml of water were added and blended to give batter.

Next, pork used as a material for a pork cutlet was sliced in a size of 1 cm in thickness, 10 cm in length and 5 cm in width. The pork slice was softly toweled so that water was removed, and then immersed in the batter. Thereafter, the pork slice covered with the batter was crumbed, and then deep-fried in vegetable oil previously heated to 170° to 180° C. A pork cutlet was thus cooked.

The pork cutlet thus cooked was left to stand in a 20° C. temperature-controlled chamber, and the degree of rancidity was examined by visual observation and smelling. Results are as shown in Table 1.

TABLE 1

|  | Preservation days: | | | | | |
|---|---|---|---|---|---|---|
|  | 1 | 3 | 4 | 5 | 6 | 9 |
| Control: | — | — | — | — | x |  |
| Present invention: | — | — | — | — | — | x |

| Example 7 (Tests on fried noodles) | | | |
|---|---|---|---|
|  | (A) | (B) | (C) |
| Wheat flour*: | 640 g | 720 g | 800 g |
| Salt: | 16 g | 16 g | 16 g |
| Natural soda powder**: | 2.4 g | 2.4 g | 2.4 g |
| Water: | 270 ml | 270 ml | 270 ml |
| Dafatted corn germ: | 160 g | 80 g | — |

(In the table. "—" means "normal". "x". "rancid".)
*A 1:1 mixture of medium flour and semi-strong flour
**For use in instant noodles Using a noodle-maker (4.8 inch roll) and a kneader, materials with the above formulation were kneaded for 10 minutes, folded three times, non-aged, and rolled four times to make a noodle sheet with a thickness of 1.3 m, which was cut with a #20 cutting blade into noodle strips. In the above formulation, the defatted corn germ (1) obtained in Example 1 was used.

The resulting noodle strips were steamed for 2 minutes, and thereafter fried in palm oil for 1 minute and 30 to 40 seconds. The resulting fried noodles were divided into 50 g portions, which were preserved in a 50° C. temperature-controlled chamber to measure peroxide values (POV) with time.

The POV was measured in the following manner: To a sample, 200 ml of a 2:1 mixed solvent of chloroform and methanol was added, and the sample and the solvent were vigorously blended using a blender. Solid contents were removed by filtration under reduced pressure, and the resulting mixed solvent containing oil contents was evaporated in a stream of nitrogen. A 1 g portion of the resulting oil contents was collected, and dissolved in a 2:3 mixed solvent of chloroform and acetic acid. In a stream of nitrogen, 0.5 ml of a potassium iodide saturated solution was added, followed by blending for 1 minutes. Thereafter, the mixture was left to stand for 5 minutes. After addition of 30 ml of water, the mixture was vigorously blended, and 1 ml of a starch solution was added as an indicator. The resulting mixture was titrated using sodium thiosulfate to measure the peroxide values.

Figure 3:
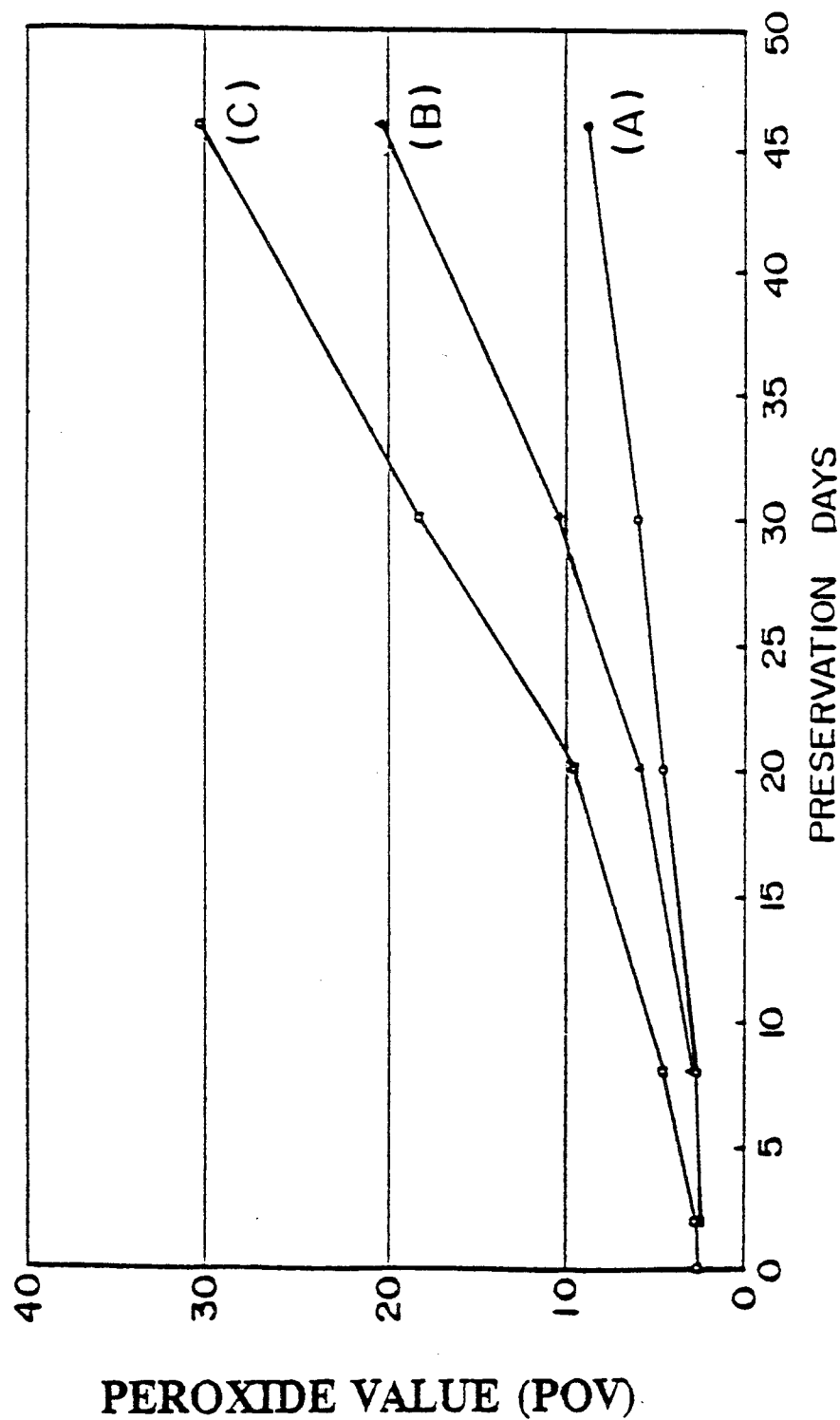
FIG. 3 shows changes with time of peroxide values (POV) of fats and oils contained in fired noodles.

Results obtained are shown in FIG. 3.

EXAMPLE 8

Using as fats and oils a fish oil containing 25% of EPA and also using the samples (1), (2), (3) and (5), the following experiment was carried out.

The fish oil was dissolved in ether, and thereafter the solution was added to each sample so as for the fish oil and the sample to be 1:9 in weight ratio. Ether was removed while they were blended in a mortar. The resulting mixture was again mixed with lactose in ethanol in a weight ratio of 9:1, followed by tableting by means of a tablet machine.

The resulting tablets were preserved at 60° C. in the dark, and taken out at intervals of days to measure peroxide values (POV) by the isocyanate method. To carry out the measurement, 4 ml of a 2:1 mixed solvent of chloroform and methanol was added in a sample, and the mixture was vigorously stirred. Thereafter, the resulting mixture was centrifuged under conditions of 3,000 rpm $\times$ 10 min. The supernatant liquid was collected in an amount of 0.25 ml, and diluted with 4.55 ml of a 2:1 mixed solvent of chloroform and methanol. Thereafter, 0.1 ml of an aqueous 30% solution of $NH_4SCN$ and 0.1 ml of a 3.5% hydrochloric acid solution of 0.02M of $FeSO_4$ were added. After just 3 minutes, absorbance at 500 nm was measured.

Figure 4:
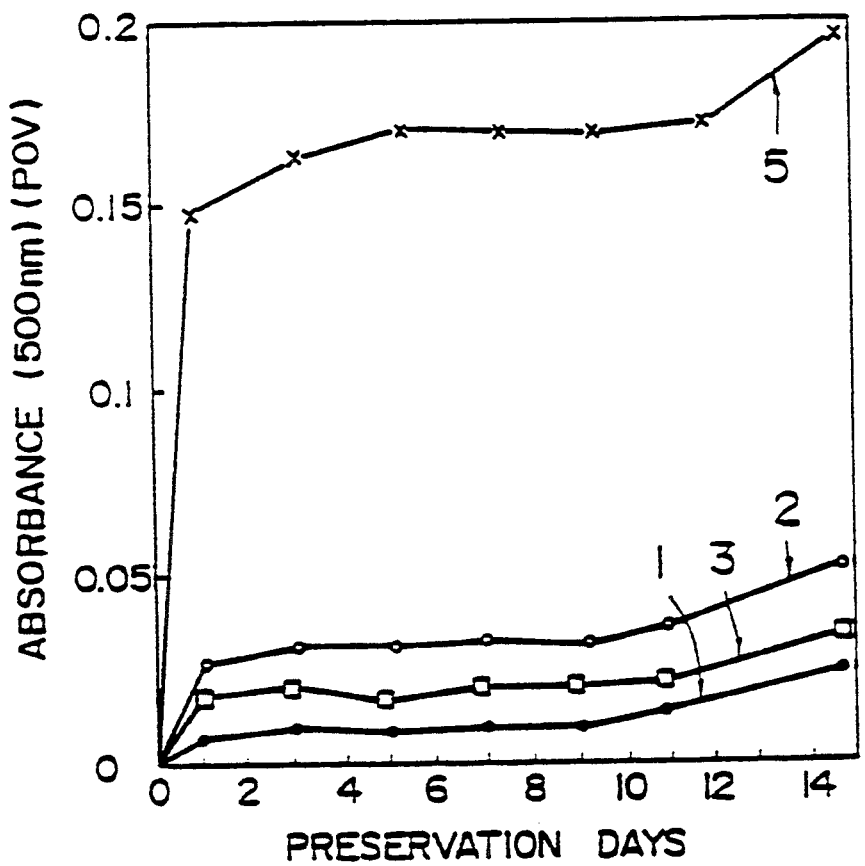
FIG. 4 shows peroxide values (POV) measured by the isocyanate method when a fish oil containing EPA has been treated with various natural materials.

Results obtained are shown in FIG. 4. It is seen from the results that, compared with the wheat gluten (5), the defatted corn germs (1) to (3) of the present invention each show very low values of POV and thus the oxidation of fish oil has been inhibited.

What is claimed is:

1. A method for inhibiting oxidation, comprising adding a defatted corn germ to an unsaturated compound selected from the group consisting of an unsaturated fat, an unsaturated oil, an unsaturated fatty acid and an unsaturated hydrocarbon, or to a food and drink containing said unsaturated compound, the amount of said defatted corn germ being sufficient to inhibit oxidation of said unsaturated compound.

2. A method for inhibiting oxidation according to claim 1, wherein said corn germ has an oil content of not more than 3% by weight.

3. A method for inhibiting oxidation according to claim 2, wherein said corn germ is defatted by supercritical gas extraction.

4. A method for inhibiting oxidation according to claim 3, wherein the ratio of the unsaturated fat or oil, the unsaturated fatty acid or the unsaturated hydrocarbon to the defatted corn germ is from 0.5:99.5 to 70:30 in weight ratio.

5. A method for inhibiting oxidation according to claim 4, wherein said unsaturated fat or oil, unsaturated fatty acid and unsaturated hydrocarbon are at least one selected from soy bean oil, perilla oil, jojoba oil, almond oil, fish oil, eicosapentaenoic ethyl eicosapentaenoate acid, docosahexaenoic acid, ethyl docosahexaenoate and squalene.

6. A method for inhibiting oxidation according to claim 5, wherein said corn germ has an oil content of not more than 1% by weight and the ratio of the unsaturated fat or oil, the unsaturated fatty acid or the unsaturated hydrocarbon to the defatted corn germ is from 0.5:99.5 to 50:50 in weight ratio.

7. A method for inhibiting oxidation according to claim 3, wherein said corn germ has an oil content of not more than 1% by weight and the ratio of the unsaturated fat or oil, the unsaturated fatty acid or the unsaturated hydrocarbon to the defatted corn germ is from 0.5:99.5 to 50:50 in weight ratio.

8. A method for inhibiting oxidation according to claim 1, wherein said corn germ is defatted by supercritical gas extraction.

9. A method for inhibiting oxidation according to claim 1, wherein said corn germ is defatted by organic solvent extraction.

10. A method for inhibiting oxidation according to claim 1, wherein said unsaturated fat or oil, unsaturated fatty acid and unsaturated hydrocarbon are at least one selected from soy bean oil, perilla oil, jojoba oil, almond oil, fish oil, eicosapentaenoic acid, docosahexaenoic acid, and squalene.

11. A method for inhibiting oxidation according to claim 1, wherein the ratio of the unsaturated fat or oil, the unsaturated fatty acid or the unsaturated hydrocarbon to the defatted corn germ ranges from 0.5:99.5 to 70:30 in weight ratio.

12. A method for inhibiting oxidation according to claim 11, wherein said ratio is from 0.5:99.5 to 50:50.

13. A method for inhibiting oxidation according to claim 1, wherein said corn germ has an oil content of not more than 1% by weight.

14. A method for inhibiting oxidation according to claim 1, wherein said corn germ has an oil content of not more than 1% by weight and the ratio of the unsaturated fat or oil, the unsaturated fatty acid or the unsaturated hydrocarbon to the defatted corn germ is from 0.5:99.5 to 50:50 in weight ratio.

* * * * *

UNITED STATES PATENT AND TRADEMARK OFFICE
CERTIFICATE OF CORRECTION

PATENT NO. : 5,120,556

DATED : June 9, 1992

INVENTOR(S) : Kenshiro FUJIMOTO et al

It is certified that error appears in the above-identified patent and that said Letters Patent is hereby corrected as shown below:

Column 8, line 8 (claim 5), after "eicosapentaenoic" insert --acid,--.

Column 8, line 9 (claim 5), delete "acid" (first occurrence).

Signed and Sealed this

Thirtieth Day of August, 1994

Attest:

BRUCE LEHMAN

Attesting Officer      Commissioner of Patents and Trademarks